(12) United States Patent
Beleski, Jr.

(10) Patent No.: US 6,827,358 B2
(45) Date of Patent: Dec. 7, 2004

(54) CAMBERING VEHICLE AND MECHANISM

(75) Inventor: J. Gildo Beleski, Jr., Huntington Beach, CA (US)

(73) Assignee: Trikke Tech, Inc., Marina del Rey, CA (US)

( * ) Notice: Subject to any disclaimer, the term of this patent is extended or adjusted under 35 U.S.C. 154(b) by 0 days.

(21) Appl. No.: 10/331,558

(22) Filed: Dec. 31, 2002

(65) Prior Publication Data

US 2003/0090076 A1 May 15, 2003

Related U.S. Application Data

(63) Continuation of application No. 09/708,028, filed on Nov. 8, 2000, now Pat. No. 6,499,751, which is a continuation-in-part of application No. 09/434,371, filed on Nov. 5, 1999, now Pat. No. 6,220,612.

(51) Int. Cl.$^7$ .............................................. B62M 1/00
(52) U.S. Cl. ........................... 280/87.041; 280/87.042; 280/124.11
(58) Field of Search ................. 280/87.041, 87.042, 280/87.05, 639, 40, 652, 655, 659, DIG. 6, 124.11, 124.111; 403/61, 59, 52, 53, 151

(56) References Cited

U.S. PATENT DOCUMENTS

| | | | |
|---|---|---|---|
| 4,045,048 A | | 8/1977 | Irwin |
| 4,047,732 A | | 9/1977 | Williams et al. |
| 4,050,711 A | | 9/1977 | Denzer |
| 4,050,712 A | | 9/1977 | Denzer |
| 4,050,713 A | * | 9/1977 | Williams ..................... 280/278 |
| 4,054,300 A | * | 10/1977 | Winchell ..................... 280/278 |
| 4,065,146 A | * | 12/1977 | Denzer ....................... 280/278 |
| 4,071,261 A | * | 1/1978 | Winchell .................... 280/220 |
| 4,076,270 A | | 2/1978 | Winchell |
| 4,087,104 A | | 5/1978 | Winchell |
| 4,087,106 A | | 5/1978 | Winchell |
| 4,087,108 A | | 5/1978 | Winchell |
| 4,088,338 A | | 5/1978 | Winchell |
| 4,123,079 A | | 10/1978 | Biskup |
| 4,133,551 A | * | 1/1979 | Biskup ....................... 280/221 |
| 4,165,093 A | * | 8/1979 | Biskup ....................... 280/220 |
| 4,540,192 A | * | 9/1985 | Shelton ...................... 280/282 |
| 5,039,121 A | | 8/1991 | Holter |
| 5,330,214 A | * | 7/1994 | Brooks et al. ......... 280/87.042 |
| 5,762,351 A | * | 6/1998 | SooHoo ...................... 280/267 |
| 5,785,331 A | | 7/1998 | Rappaport |

(List continued on next page.)

FOREIGN PATENT DOCUMENTS

| | | |
|---|---|---|
| DE | 2413377 | 10/1975 |
| FR | 2 689 082 | 10/1993 |
| WO | WO 92/00217 | 1/1992 |

*Primary Examiner*—Christopher P. Ellis
*Assistant Examiner*—J. Allen Shriver
(74) *Attorney, Agent, or Firm*—Knobbe, Martens, Olson & Bear, LLP

(57) ABSTRACT

A cambering vehicle includes a single steerable front wheel and a pair of rear wheels at the rearward ends of trailing arms extending from the front structure. The two arms are articulated to the front structure, and move arcuately in planes parallel to the steering column. In one embodiment the arms are linked by a yoke, and traverse equal arcuate distances in opposite directions relative to one another. In another embodiment the yoke is replaced by a transverse link, with elastomer bushings connecting the link ends to their respective arms. The vehicle operates using the principle of conservation of angular momentum, with the vehicle traveling a sinusoidal path and the operator leaning to the inside of the turn. This moves the center of gravity of the vehicle and operator to the inside of the turn, thus accelerating vehicle and operator along the turning path to increase velocity of the device.

24 Claims, 6 Drawing Sheets

U.S. PATENT DOCUMENTS

| | | | |
|---|---|---|---|
| 5,971,411 A | * 10/1999 | Jones et al. | 280/87.042 |
| 6,220,612 B1 | * 4/2001 | Beleski, Jr. | 280/87.041 |
| 6,279,929 B1 | * 8/2001 | Fruechtenicht | 280/87.041 |
| 6,286,632 B1 | * 9/2001 | Chai | 188/29 |
| 6,443,470 B1 | * 9/2002 | Ulrich et al. | 280/87.041 |
| 6,467,781 B1 | * 10/2002 | Feng | 280/87.01 |
| 6,467,986 B2 | * 10/2002 | Feng | 403/93 |
| 6,499,751 B1 | * 12/2002 | Beleski, Jr. | 280/87.041 |
| 6,517,093 B2 | * 2/2003 | Feng | 280/87.042 |
| 6,554,302 B1 | * 4/2003 | Liu | 280/87.041 |
| 2001/0003392 A1 | * 6/2001 | Rappaport | 280/87.041 |
| 2002/0050695 A1 | * 5/2002 | Feng | 280/87.041 |
| 2002/0063406 A1 | * 5/2002 | Feng | 280/87.041 |

\* cited by examiner

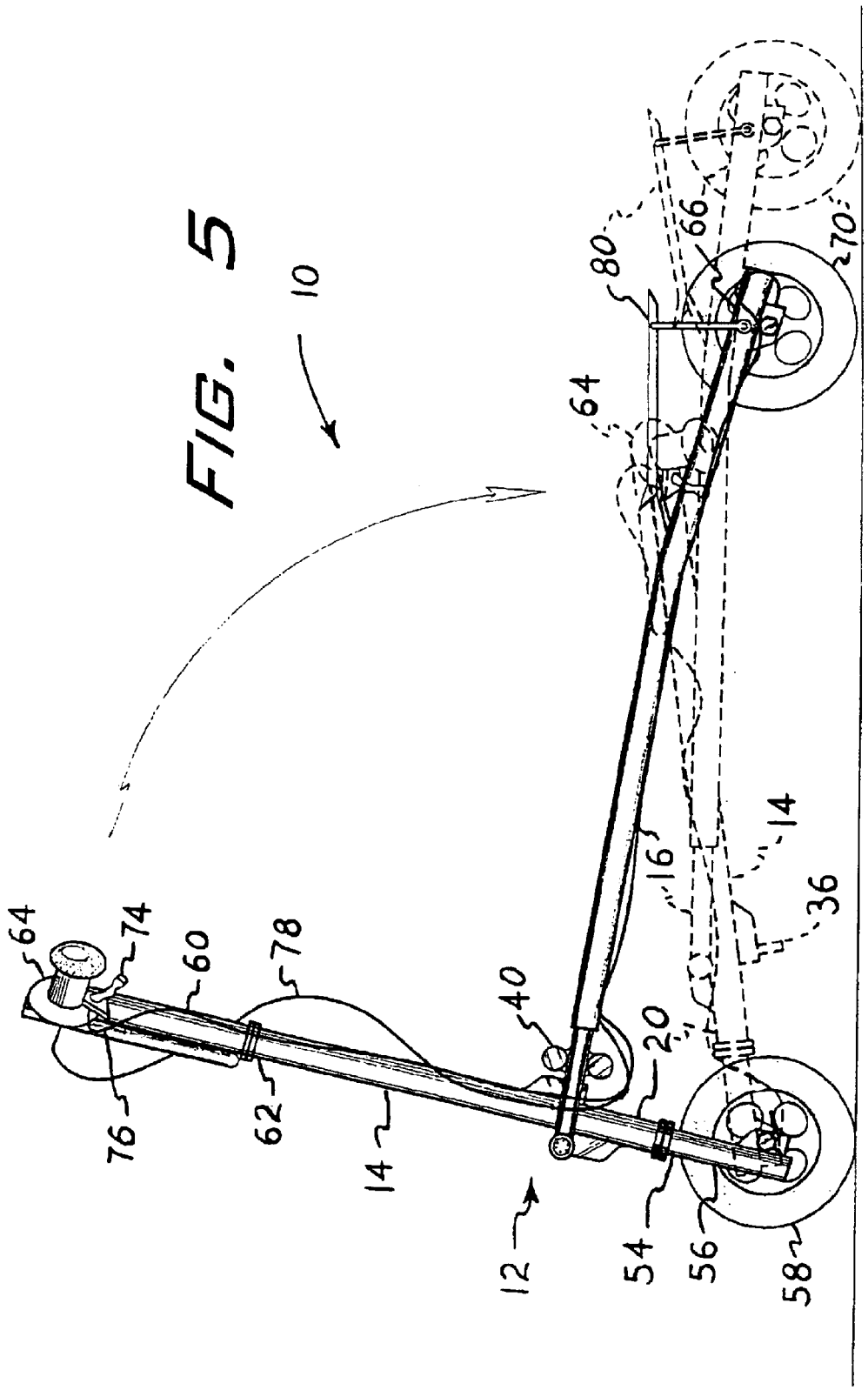

CAMBERING VEHICLE AND MECHANISM

CROSS-REFERENCE TO RELATED APPLICATIONS

This application is a continuation of application Ser. No. 09/708,028 filed Nov. 8, 2000, now U.S. Pat. No. 6,499,751, which is a continuation-in-part of application Ser. No. 09/434,371 filed on Nov. 5, 1999, now U.S. Pat. No. 6,220,612 B1.

BACKGROUND OF THE INVENTION

1. Field of the Invention

The present invention relates generally to small, three wheeled, operator propelled vehicles, and more specifically to the class of vehicle known as "cambering vehicles," in which forward motion is provided by the alternating shifting of weight from side to side as the vehicle travels a sinusoidal path, due to the conservation of angular momentum. One embodiment of the present cambered vehicle includes a novel yoke linkage between the two trailing arms for the rear wheels, which links the two trailing arms together for alternating motion. The easily removable yoke also provides for ease of folding of the vehicle for storage. In another embodiment, a transverse, rocking link is provided in lieu of the yoke, with the link incorporating elastomeric end bushings to provide for relative movement between the arms and the ends of the link. The link is not conveniently removable, but the arms include folding means for compact storage of the vehicle.

2. Description of the Related Art

A type of operator propelled three wheeled vehicle known as a "cambering vehicle" has a single steerable front wheel and a pair of laterally spaced rear wheels on trailing arms which are articulated to the front column from which the front wheel extends. As the vehicle travels a sinusoidal path, the operator shifts his or her weight to the inside of each turning arc, thus shifting the center of mass to the inside of each arc. This results in a series of accelerations due to the conservation of momentum of the vehicle and operator. In this manner, forward motion is attained.

The above principle of propulsion is well known, as described in at least one of the issued patents discussed further below. Such vehicles utilize various mechanisms (cables and pulleys, gears, bellcranks, etc.) to link the two trailing arms together, with such mechanisms being cited in the related art discussed further below. However, the present cambered vehicle differs from those of the prior art in that it utilizes a novel yoke mechanism to link the motion of the two trailing arms together, with the yoke also providing for ease of folding of the present vehicle by means of the removal of a single fitting. Another embodiment comprises a transverse link, with elastomeric bushings at each end for arm attachment. The bushings provide the resilience required for relative motion between the ends of the link and the arms.

A discussion of the related art of which the present inventor is aware, and its differences and distinctions from the present invention, is provided below.

U.S. Pat. No. 4,045,048 issued on Aug. 30, 1977 to Clarence C. Irwin, titled "Trailing Arm Cambering Vehicle With Stabilizer Linkage Having Locking Means For Parking And Stowage," describes a cambering vehicle in which the trailing arms are linked to a bellcrank which is pivotally attached to the front column well above the attachment point of the arms to the front column. The two arms are linked to the bellcrank by pushrods. A locking plate having an arcuate slot therein with a threaded locking pin extending therethrough, permits a threaded knob to be tightened to lock the mechanism in a stationary position for upright storage of the vehicle. The folding mechanism is relatively complex in comparison to the present vehicle, in that Irwin requires both of the bellcrank connecting links to be removed. Moreover, Irwin does not disclose any form of elastomeric connection between any of the fittings or mechanisms of his cambering vehicle, as provided in one embodiment of the present invention.

U.S. Pat. No. 4,047,732 issued on Sep. 13, 1977 to Jerry K. Williams et al., titled "Cambering Vehicle With Hydraulic Stabilizer And Equalizer," describes a vehicle similar to that of the Irwin '048 U.S. patent discussed immediately above, but having interconnected hydraulic cylinders linking the two trailing arms, rather than a mechanical linkage. The system functions similarly to that of the Irwin '048 U.S. patent, with the extension of one cylinder causing the retraction of the opposite cylinder. A valve is used to shut off the flow of hydraulic fluid between the two struts to lock the position of the vehicle as desired. The valve may also be adjusted to allow fluid to flow from one end to the other of the two cylinders, thereby allowing both cylinders to collapse simultaneously for folding the vehicle. The present vehicle avoids fluids and hydraulics, utilizing a yoke member for connecting the two trailing arms, and moreover does not require any form of intermediate links between the trailing arms and the yoke. Williams et al. do not disclose any form of elastomeric fittings or connectors attaching any of the cambering components together, as provided in an embodiment of the present invention.

U.S. Pat. No. 4,050,711 issued on Sep. 27, 1977 to Richard E. Denzer, titled "Cambering Device For Cambering Vehicle," describes a trailing arm interconnect mechanism having two opposed arms disposed about a single pivot. The arms may be locked together to form a bellcrank to provide opposite action of the two trailing arms, or may be folded to allow the front column to be folded to the trailing arms for storage of the device. As in the other cambering vehicles discussed above, the Denzer vehicle links the trailing arms to the actuating mechanism by connecting rods, rather than using a direct yoke or transverse link mechanism as in the present vehicle.

U.S. Pat. No. 4,050,712 issued on Sep. 27, 1977 to Richard E. Denzer et al., titled "Cambering Device For Cambering Vehicle," describes a mechanism very similar to that of the '711 U.S. patent to the same first inventor, discussed immediately above. The device of the '712 patent differs in that the central mechanism comprises a pair of meshed sector gears which may be locked together to provide the alternating action of the two trailing arms and their links to the mechanism. Unlocking the gears allows the forward structure to be folded adjacent to the two trailing arms. The device differs from the present cambering vehicle mechanism, with its single yoke or transverse link configuration.

U.S. Pat. No. 4,050,713 issued on Sep. 27, 1977 to Jerry K. Williams, titled "Cambering Device For Cambering Vehicle," describes a mechanism similar to that of the '048 U.S. patent to Irwin, discussed further above. The device of the '713 patent comprises a pair of arcuate bellcranks which may be locked together to provide the opposite lifting and descending action of the two trailing arms, with the locking means allowing the two bellcranks to be arcuately folded together for folding the forward structure adjacent the trailing arms for storage.

U.S. Pat. No. 4,054,300 issued on Oct. 18, 1977 to Frank J. Winchell, titled "Cambering Vehicle With Trailing Arms Interconnected By Geared Stabilizer And Equalizer Mechanism," describes a mechanism comprising a pair of opposed sector bevel gears disposed upon each pivot shaft of the trailing arms, with a central spur gear linking the two sector gears to provide equal and opposite arcuate movement of the trailing arms. The mechanism includes locking means for parking the vehicle, and means for releasing the gears to allow for folding the front structure adjacent the trailing arms. No yoke or transverse link mechanism is provided. The Winchell vehicle differs further in that it includes an engine driving the front wheel, which teaches away from the conservation of angular momentum principle of operation of unpowered cambering vehicles, including the present vehicle.

U.S. Pat. No. 4,065,146 issued on Dec. 27, 1977 to Richard E. Denzer, titled "Cambering Device For Cambering Vehicle," describes a mechanism similar to that described in the '713 U.S. patent discussed further above. A pair of bellcranks works between opposite links to the two trailing arms, to cause the trailing arms to work opposite one another, as is known in the cambering vehicle art. The two bellcranks may be adjusted relative to one another to allow the vehicle to fold, in the manner generally described in the '713 U.S. patent. As in the case of the '713 U.S. patent and others known to the present inventor, no yoke or transverse elastomeric end link means is disclosed.

U.S. Pat. No. 4,071,261 issued on Jan. 31, 1978 to Frank J. Winchell, titled "Lock Bar For Cambering Vehicle," describes a mechanism quite similar to that described in the '711 U.S. patent discussed further above, but including a lock bar which may be installed between the two trailing arms to secure them together for parking the vehicle. Again, no yoke mechanism is provided for tying together the motion of the two trailing arms, as provided by the present cambering vehicle mechanism. Winchell incorporates a transverse bellcrank, but the crank communicates with the two arms by means of a pair of generally vertically disposed links, rather than directly. Moreover, Winchell does not disclose any form of elastomer in the crank ends, as provided by the present invention.

U.S. Pat. No. 4,076,270 issued on Feb. 28, 1978 to Frank J. Winchell, titled "Foldable Cambering Vehicle," describes a trailing arm interconnect mechanism comprising a continuous cable run, with an idler pulley serving to reverse the direction of travel of the cable about the opposite trailing arm pulleys. The Winchell '270 U.S. patent also discloses a bellcrank trailing arm interconnect system similar to that described in the '711 U.S. patent discussed further above, and further discloses an engine powered embodiment similar to that of the '300 U.S. patent to the same inventor, discussed further above. Again, no yoke or transverse link mechanism is provided for linking the two trailing arms, as provided in the present cambering vehicle invention.

U.S. Pat. No. 4,087,104 issued on May 2, 1978 to Frank J. Winchell et al., titled "Method Of Manually Propelling A Cambering Vehicle," describes a pulley system for interconnecting the two trailing arms, essentially the same as that described in the '270 U.S. patent discussed immediately above. The '104 U.S. patent also describes the principle of conservation of angular momentum for the operation of cambered vehicles, and includes a skate equipped embodiment.

U.S. Pat. No. 4,087,106 issued on May 2, 1978 to Frank J. Winchell, titled "Cambering Vehicle," describes various embodiments incorporating the cable actuation, motor power, and skate and ski equipped embodiments generally disclosed in the '270 and '104 U.S. patents to the same inventor, and discussed above. Although a throttle control lever is provided, no brake means is disclosed.

U.S. Pat. No. 4,087,108 issued on May 2, 1978 to Frank J. Winchell, titled "Cambering Vehicle With Trailing Arms Interconnected By Spur Gearing," describes a mechanism in which the two pivot axles of the trailing arms are non-concentric with one another, and are interconnected by mating gears. A motorized embodiment is also disclosed, similar to that of the '300, '270, and '106 U.S. patents to the same inventor, discussed above. As in those patents and others with which the present inventor is familiar, no yoke or transverse elastomeric end link mechanism for interconnecting the two trailing arms, is disclosed in the '108 U.S. patent, and while a declutching lever is provided, no brake control lever is disclosed.

U.S. Pat. No. 4,088,338 issued on May 9, 1978 to Frank J. Winchell et al., titled "Cambering Vehicle With Cable Stabilizer And Equalizer," describes a vehicle utilizing a pulley system for linking the two trailing arms, similar to the mechanisms disclosed in the '270 and '104 U.S. patents to the same first inventor, discussed further above. The same distinctions noted between those devices and the present invention are seen to apply here.

U.S. Pat. No. 4,123,079 issued on Oct. 31, 1978 to Edward J. Biskup, titled "Occupant Propelled Cambering Vehicle," describes one embodiment wherein the two trailing arms are resiliently interconnected by means of a torsion bar between the two trailing arm pivot axles, and another embodiment wherein the trailing arms are resilient. In both cases the resilient means allows the arms to move independently of one another, unlike the yoke interconnect and rigid trailing arms of the present invention. In the case of the transverse link of one embodiment of the present invention, the present link includes resilient bushings at each end thereof which fit into passages in the respective left and right trailing arms. These bushings provide resilience to allow articulation both angularly and torsionally, which the torsion bar of the Biskup '079 patent cannot do.

U.S. Pat. No. 4,133,551 issued on Jan. 9, 1979 to Edward J. Biskup, titled "Cambering Device For Cambering Vehicle," describes a trailing arm interconnect mechanism comprising a crank arm having oppositely offset cranks which ride in slots in the opposite trailing arms. As one crank arm travels in one direction, the opposite crank arm travels in the opposite direction, thereby causing the two trailing arms to work opposite to one another. Again, no yoke or transverse elastomeric end link mechanisms are provided.

U.S. Pat. No. 4,165,093 issued on Aug. 21, 1979 to Edward J. Biskup, titled "Occupant Propelled Cambering Vehicle," describes torsionally resilient interconnect means for the two trailing arms, essentially the same as the interconnect means disclosed in the '079 U.S. patent. The '093 patent is a division of the '079 U.S. patent discussed further above, and the same points raised in that discussion are seen to apply here as well.

U.S. Pat. No. 4,540,192 issued on Sep. 10, 1985 to L. H. Shelton, titled "Three-Wheeled Scooter-Type Vehicle," describes a different principle of operation for such tricycle type vehicles, in which the two rear wheels remain in the same plane, but caster inwardly and outwardly with the two trailing arms also moving laterally inwardly and outwardly relative to one another. The operation is similar to skating or cross country skiing, in which the skate or ski is angled relative to the path of travel, with lateral thrust developing a forward thrust vector to propel the skier, skater, or (in the present case) vehicle forward. This principle of operation does not apply to the present vehicle.

U.S. Pat. No. 5,039,121 issued on Aug. 13, 1991 to Donovan A. Holter, titled "Tri-Skater," describes a tricycle type vehicle in which the two trailing arms are immovably affixed to the front structure during operation. A single brake is provided on the front wheel, rather than independent brakes for the two rear wheels. The principle of operation is thus more closely related to the vehicle of the '192 U.S. patent, discussed immediately above, than to the present vehicle invention.

U.S. Pat. No. 5,785,331 issued on Jul. 28, 1998 to Mark Rappaport, titled "Dual-Footboard Scooter," describes a tricycle type vehicle having a rigid frame, with the two rear wheels having fixed axles with no camber, caster, toe-in, or toe-out. The device is operated as a conventional scooter by pushing and coasting. A single brake is provided for the front wheel, whereas the present vehicle includes independent brakes for each rear wheel.

Finally, German Patent Publication No. 2,413,377 published on Oct. 2, 1975 illustrates a scooter and vertically undulating track, with the operator shifting his/her weight forwardly and rearwardly to shift the center of gravity of the vehicle over the crest of an undulation and thereby coast down the opposite side. the device of the German Patent Publication is constructed in the reverse of the present invention, with two forward wheels and one rearward wheel, and the frame is rigid, thus precluding any cambering action or operation by conservation of angular momentum.

None of the above inventions and patents, either singly or in combination, is seen to describe the instant invention as claimed.

SUMMARY OF THE INVENTION

The present invention comprises a cambering vehicle, wherein forward motion is achieved by lateral shift of the operator's weight to the inside of the turn as the vehicle travels a sinusoidal path. Due to the principle of conservation of angular momentum, the weight shift is partially translated to forward motion in the direction of travel. The above principle is well known, with numerous cambering vehicles utilizing various mechanisms to link the two trailing arms of the vehicle together to provide the desired action. However, the present vehicle utilizes different novel embodiments of components for linking the two trailing arms together, to provide advances in simplicity, durability, and ease of folding for storage over the relatively complex linkages and mechanisms of the prior art.

In a first embodiment, a novel yoke mechanism for linking the two trailing arms together is provided. The yoke mechanism of the present cambering vehicle provides several advantages in a single mechanism, by (1) linking the two trailing arms to articulate equally and oppositely to one another, (2) providing for folding of the vehicle for storage by the removal of a single fastener, and (3) enabling the vehicle to be provided with a simple, fixed stop means to limit the travel of the two trailing arms. The present cambering vehicle also has a separate brake for each rear wheel, with each brake being independently actuated by separate levers by the vehicle operator.

A second embodiment utilizes a lateral rocking link which is essentially permanently secured to the rear of the steering column. The link has elastomeric bushings in each end thereof, which secure in cooperating passages in the respective arms. The elastomer bushings provide the required resilience to allow the arms to rotate torsionally about their connections with the link, and also to allow the required angular movement between the link and the arms. The elastomer bushings also provide a centering action for the vehicle for greater stability, and eliminate need for any form of stand or support for holding the vehicle in an upright position when parked. Folding may be accomplished by means of appropriate lockable hinge or other mechanisms in the arms. While the present cambering vehicle is primarily supported by wheels, it will be seen that the principle of operation need not be limited to rollers or wheels, but may be applied to skis, skates, etc. as well.

Accordingly, it is a principal object of the invention to provide an improved cambering vehicle incorporating a yoke for interconnecting the two trailing arms to provide equal and opposite articulation thereof.

It is another object of the invention to provide an improved cambering vehicle which yoke mechanism is quickly and easily removable to provide for the folding of the vehicle for storage.

It is a further object of the invention to provide an improved cambering vehicle including stop means for limiting the arcuate travel of the two trailing arms.

Yet another object of the invention is to provide an improved cambering vehicle incorporating a lateral link with elastomeric end bushings connecting resiliently to the two trailing arms.

An additional object of the invention is to provide an improved cambering vehicle including independent brakes for the rear wheels, with the two brakes being actuated by separate controls to provide at least some steering or turning guidance for the vehicle.

Still another object of the invention is to provide an improved cambering vehicle incorporating wheels, but which operating principle may be applied to skis, skates, and other sliding surface contact means.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 5 is a left side elevation view of the present cambering vehicle, illustrating the folded position of the vehicle in broken lines.

Similar reference characters denote corresponding features consistently throughout the attached drawings.

DETAILED DESCRIPTION OF THE PREFERRED EMBODIMENTS

The present invention comprises an operator powered cambering vehicle, in which the vehicle is propelled forwardly by means of the principle of conservation of angular momentum as the center of gravity of the operator and vehicle are repeatedly shifted to the inside of the turn as the vehicle travels a sinusoidal path. The present vehicle utilizes a novel means of linking the articulated portions of the structure together, in order that the trailing arms of the structure subtend equal but opposite arcs during operation.

Figure 1:
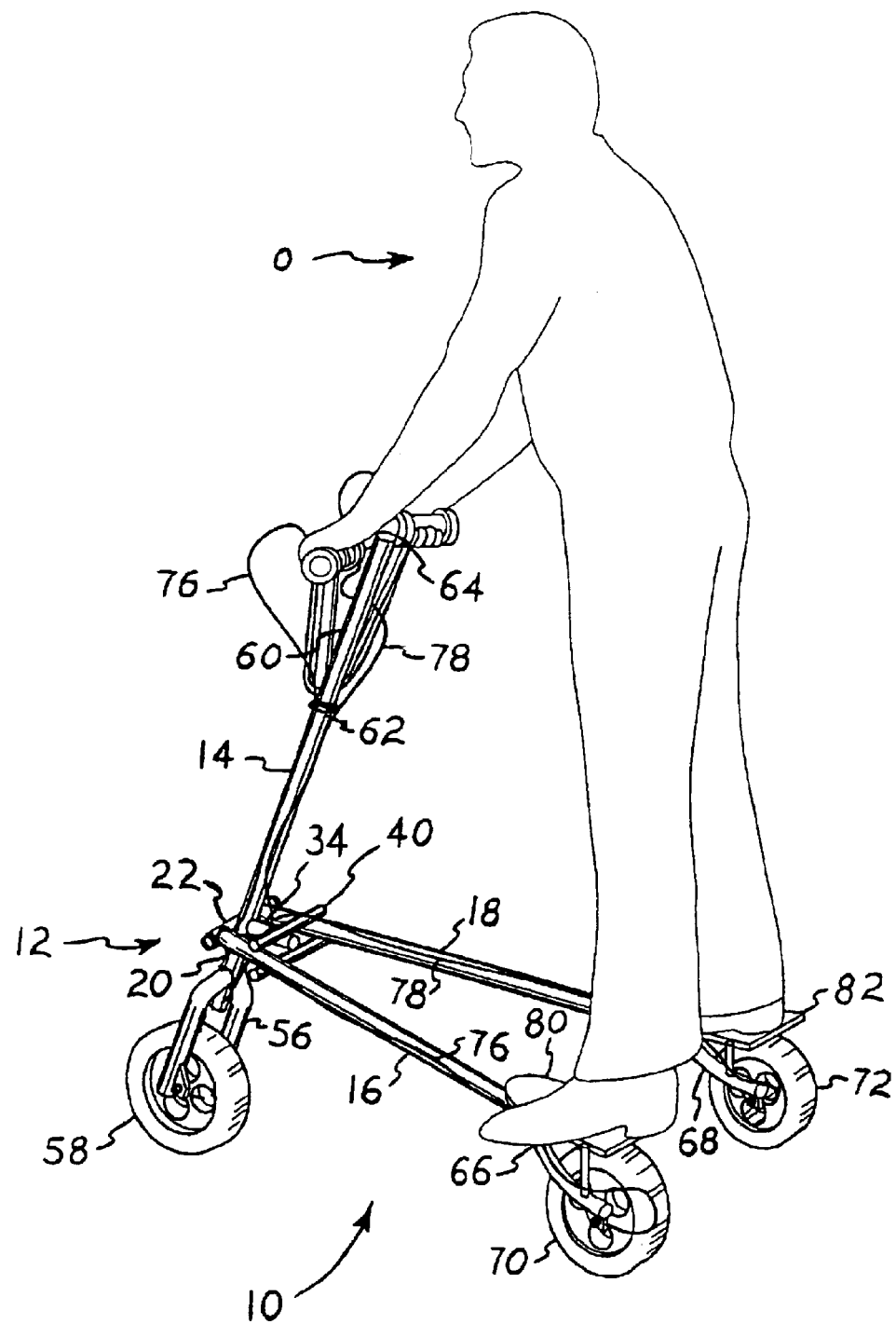
FIG. 1 is an environmental perspective view illustrating the present cambering vehicle in operation, and showing its general features.

FIG. 1 provides an environmental perspective view of the present cambering vehicle 10 in operation. The present vehicle 10 essentially comprises a tricycle frame 12 having a front column 14 and left and right trailing arms, respectively 16 and 18. The trailing arms 16 and 18 are pivotally attached to the front column 14, immediately above its lower end 20. Details of the attachment of the trailing arms 16 and 18 to the front column 14 are shown more clearly in FIGS. 2 through 4 of the drawings.

A trailing arm attachment fitting 22 is permanently secured across the front column 14 just above the lower end 20 thereof, with the attachment fitting 22 providing laterally opposed trailing arm attachment points, respectively 24 and 26, to the front column 14. The forward ends of the two trailing arms 16 and 18 have lateral bushings, respectively 28 and 30, thereacross, with a bolt 32 or other suitable fastener secured through each trailing arm bushing 28 and 30 to secure the trailing arms 16 and 18 pivotally to the fitting 22 of the lower end 20 of the front column 14.

An attachment point 34 for a yoke (shown more clearly in FIG. 4 of the drawings) or transverse link (shown in FIGS. 6 through 8D of the drawings) extends rearwardly from the front column 14 just above the lower end 20 thereof, and is positioned circumferentially about the front column 14 essentially midway between the two laterally disposed trailing arm attachment points 24 and 26. The yoke attachment 34 has a relatively smaller diameter, rearwardly extending, internally threaded shaft 36 extending therefrom, to which the central bushing 38 of the trailing arm interconnecting yoke 40 is pivotally attached by its pivot passage and removably secured by a single yoke attachment fastener 42 (e.g., threaded bolt, etc.). This attachment means is similar to that used to secure the two trailing arms 16 and 18 to the trailing arm attachment fitting 22 of the lower portion of the front column 14.

The yoke 40 comprises an upper and a lower bar, respectively 44 and 46, with the two bars being parallel to one another and spaced apart from one another by the diameter of the central bushing 38 immovably installed (e.g., welded, etc.) therebetween, which serves as a central connecting link between the two yoke bars 44 and 46. The distance between the two yoke bars 44 and 46 is essentially equal to the diameters of the two trailing arms 16 and 18, with the two bars 44 and 46 capturing the two trailing arms 16 and 18 closely therebetween when the yoke 40 is secured to its attachment point 34 of the front column 14. The left ends 44*l* and 46*l* of the two bars 44 and 46 capture the left trailing arm 16 therebetween, with the right ends 44*r* and 46*r* capturing the right trailing arm 18 therebetween.

Figure 2:
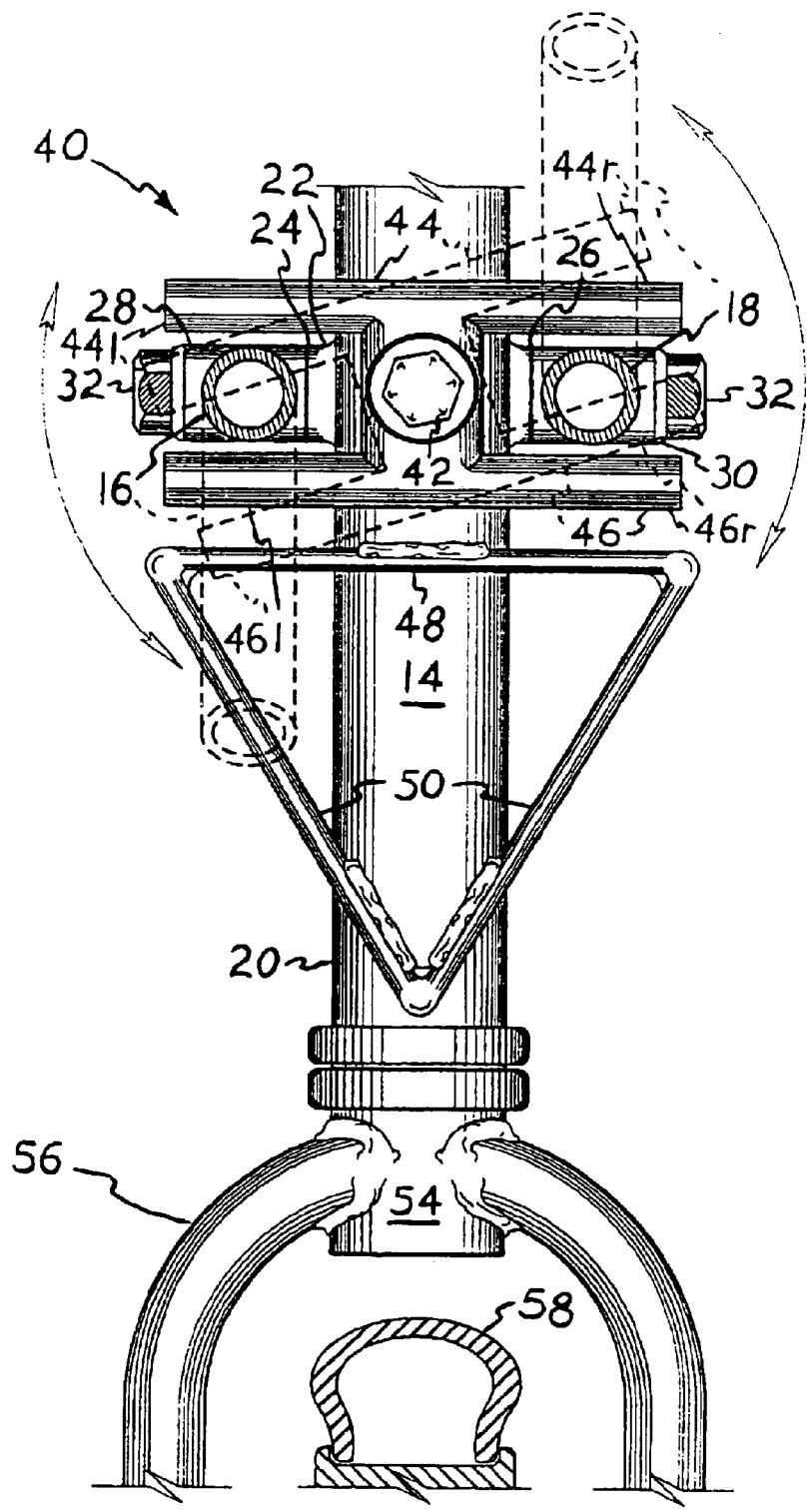
FIG. 2 is a detailed elevation view of the rear side of the front strut of the present cambering vehicle, showing details of the yoke mechanism interconnecting the two trailing arms and the operation thereof.
Figure 3:
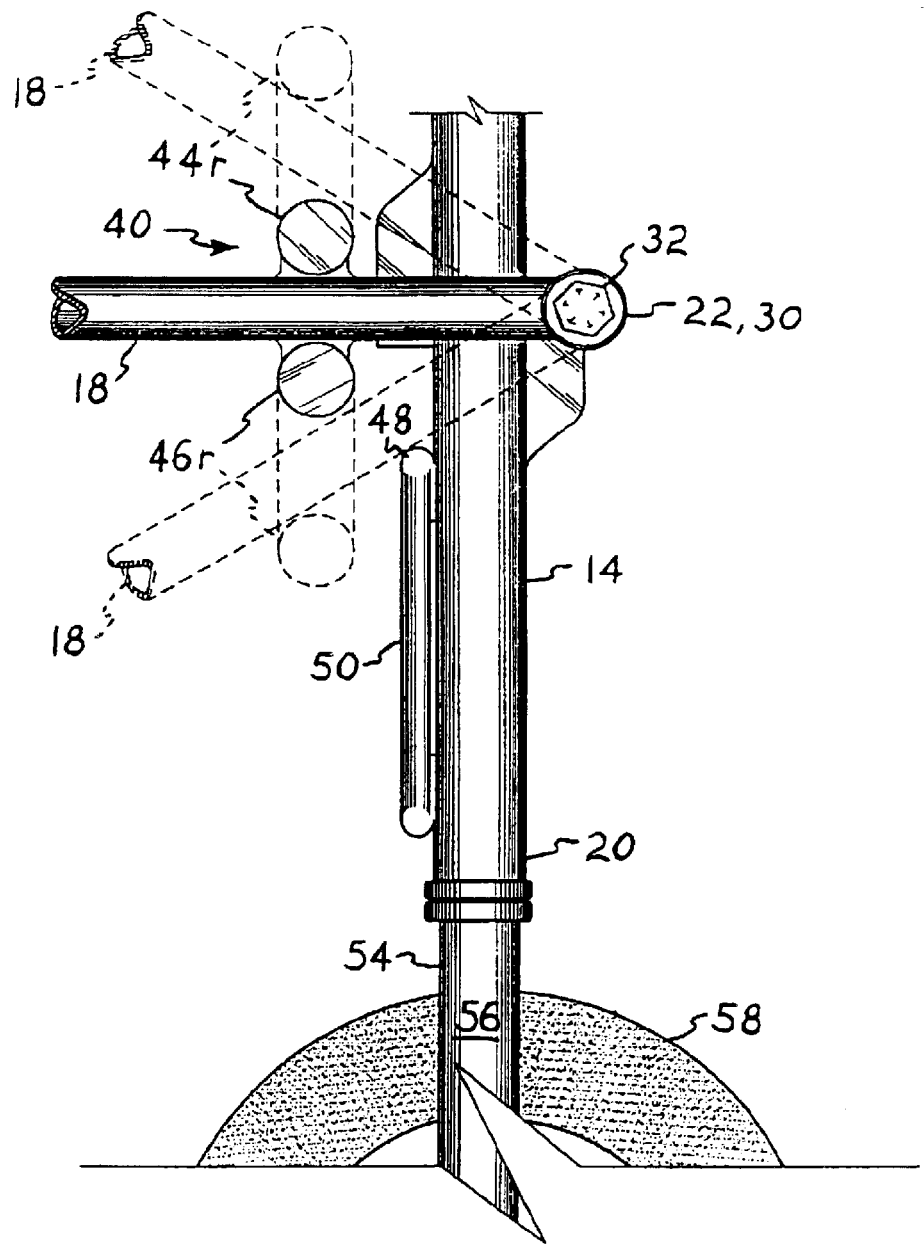
FIG. 3 is a detailed right side elevation view of the yoke mechanism of FIG. 2, showing further details of the operation thereof.

The operation of the yoke 40 structure is shown clearly in the rear and right side elevation views respectively of FIGS. 2 and 3. In each of those Figures, the central or neutral position of the yoke 40, and the two trailing arms 16 and 18 captured thereby, is shown in solid lines, with the extreme arcuate upward and/or downward positions of the trailing arms 16 and 18 and corresponding positions of the yoke arms 44 and 46 being shown in broken lines.

FIG. 2 provides an example in which the vehicle 10 is leaned or cambered to the right, with the right side trailing arm 18 displaced arcuately upwardly, as shown in broken lines in FIG. 2 and by the upper trailing arm position 18 of FIG. 3. When this occurs, the right ends 44*r* and 46*r* of the yoke arms 44 and 46 must follow the upward movement of the trailing arm 18 due to their direct contact therewith. As a result, the yoke 40 pivots arcuately about its central bushing link 38 and its attachment point 34 to the rear side of the front column 14, thus causing the opposite left ends 44*l* and 46*l* of the yoke arms 44 and 46 to deflect downwardly. When this occurs, the direct contact of the two left ends 44*l* and 46*l* of the yoke arms 44 and 46 about the left trailing arm 16, cause that arm 16 to be deflected arcuately downwardly. The amount of arcuate deflection or travel of each trailing arm 16 and 18 is identical, due to their equidistant lateral offset from the yoke attachment point 34. However, due to the pivotal actuation of the yoke 40, the two arms 16 and 18 will always travel in arcuate directions opposite to one another.

The yoke interconnection of the two trailing arms 16 and 18, provides additional advantages as well. As noted above, the yoke 40 is removably secured to the front column 14 of the vehicle 10 by means of a single fastener 42 (bolt, etc.). Removal of this single fastener 42 permits the yoke 40 to be removed from its attachment point 34, thus removing the positive interconnect between the two trailing arms 16 and 18. The ease of removal of this single yoke attachment fastener 42, and removal of the yoke 40, permits the two trailing arms 16 and 18 to be rotated simultaneously to lie generally parallel, or at least somewhat adjacent, to the front column 14. Put somewhat differently, the front column 14 may be folded downwardly to lie adjacent the two trailing arms 16 and 18, to provide a compact configuration for storage as shown in broken lines in FIG. 5 of the drawings.

Figure 4:
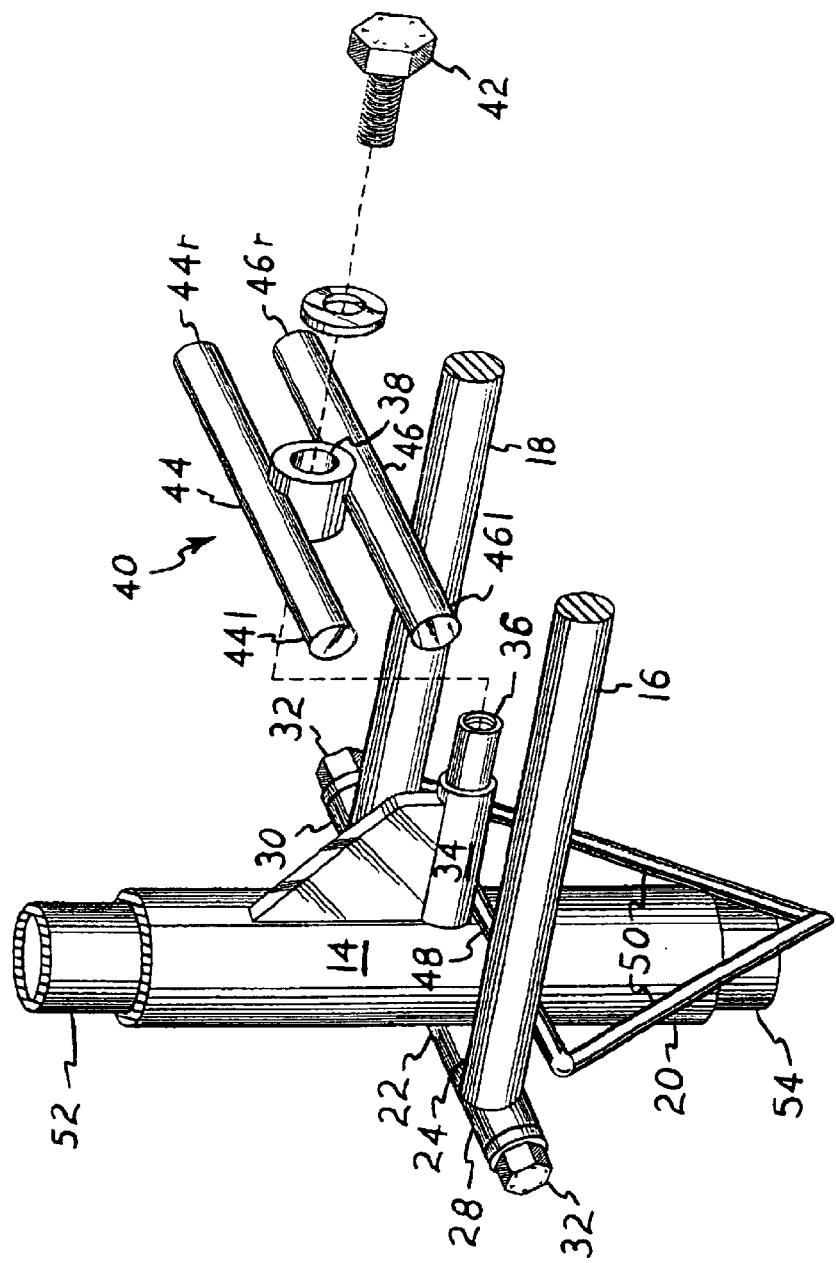
FIG. 4 is a detailed exploded perspective view of the yoke mechanism of FIGS. 2 and 3, illustrating the removal of the yoke from the front structure for folding the vehicle for storage.

It will be seen that no practicable limit is provided for the arcuate movement of the two trailing arms 16, 18 and corresponding arcuate movement of the yoke 40, by the above described structure. Accordingly, some form of stop means is preferably provided for precluding excessive arcuate movement of the two trailing arms 16 and 18, and resulting excessive camber of the vehicle 10 during operation. FIGS. 2 and 4 illustrate the trailing arm stop means of the present vehicle 10, comprising a lateral stop 48 which is immovably affixed to the back of the front column 14 immediately below the yoke attachment point 34. The stop 48 preferably includes lateral bracing 50, with the stop 48 and bracing 50 together comprising a generally triangular configuration, as shown.

When either the left or the right trailing arm 16 or 18 contacts the corresponding side of the stop bar 48, its arcuate movement is limited to that extent, with the interconnect of the opposite trailing arm by means of the yoke 40 serving to limit the arcuately opposite movement of that opposite arm. It will be seen that the stop means may take on other forms (e.g., a flat plate welded to the back of the column 14, etc.) as desired.

The cambering vehicle 10 of the present invention is illustrated throughout the drawings as a wheeled vehicle, although it will be seen that the vehicle 10 may be equipped with virtually any conventional type of either rolling or sliding surface contact means (e.g., in-line or other wheeled skates, ice skates, skis, etc.), as described in U.S. Pat. No. 4,087,106 to Winchell et al., discussed in the Description of the Related Art further above. The conservation of angular momentum principle of operation utilized by the present vehicle 10 is not limited to rolling means (e.g., wheels, roller skates, etc.), but may be applied to any low friction surface contact means allowing the vehicle 10 to travel over a surface with minimal frictional losses.

The wheeled embodiment of the present vehicle 10 exemplified in the drawings has a steering shaft 52 installed concentrically through the front column 14 (shown most clearly in FIG. 4 of the drawings), with the steering shaft 52 having a lower end 54 extending from the lower end 20 of the front column 14 with a wheel fork 56 (shown in FIGS. 1, 2, 3, and 5) extending therefrom for carrying a single steerable wheel 58 therein.

The steering shaft 52 has an opposite upper end 60 which extends beyond the upper end 62 of the front column 14, with the upper end 60 of the steering shaft 52 including steering means (e.g., handlebars 64, as illustrated in FIGS. 1 and 5)) extending therefrom, for the operator to steer the present vehicle 10 as desired. Turning the handlebars 64 (or other steering means which may be provided) turns the steering shaft 52 within the front column 14 and turns the front wheel fork 56 with its front wheel 58 captured therein (or other surface contact means, as noted above) to steer and turn the vehicle 10 as desired.

Each trailing arm 16 and 18 has a rearward end, respectively 66 and 68, with surface contact means extending therefrom (e.g., wheels 70 and 72, as shown in FIGS. 1 and 5, but alternatively other means such as skates, skis, etc., as noted further above). As the present vehicle 10 is capable of moderate speeds on a smooth and level surface, on the order of a fast running pace, the two rear wheels 70 and 72 each include conventional brake means, with the left and right brakes being independent of one another. The left and right brakes of the rear wheels 70 and 72 are actuated by separate and independent actuating or control means, e.g., the conventional brake actuating lever 74 illustrated in FIG. 5 of the drawings, with it being understood that an essentially identical second lever, not shown, is provided at the right hand grip of the handlebars 64 for actuating the brake of the right rear wheel 72. The two brake actuating means operate the brakes by means of left and right brake cables, respectively 76 and 78.

The operator O of the present vehicle 10 operates the vehicle by standing atop the left and right foot rests, respectively 80 and 82, located at the rearward ends 66 and 68 of the two trailing arms 16 and 18 above their respective rear wheels 70 and 72, and gripping the steering means 64. The operator O then pushes off with one foot and simultaneously turns the vehicle 10 to the left or right as desired to establish a given angular momentum for the vehicle 10 and operator O. Leaning into the turn moves the center of gravity of the operator O and vehicle 10 to the inside of the turn. As the angular momentum must be conserved, the shifting of the center of gravity to a smaller radius results in a linear acceleration along the arcuate path of the turn, with the acceleration corresponding to the amount of the shift of the vehicle and operator center of gravity, less any frictional losses. The cambering of the vehicle 10 to lean to the inside of the turn is provided by the arcuate travel of the two trailing arms, with their arcuate motion being limited to equal and opposite motions by means of the yoke interconnection means of the present invention.

The above described process is continued in the opposite direction, with each shift of the operator O and vehicle 10 center of gravity to the inside of the turn (in whichever direction of turn) resulting in a linear acceleration along the arcuate path of travel of the vehicle 10. On a smooth and level surface, the resulting speed can be fairly high, with speed being controlled by the independently actuated brakes of the rear wheels, which can also assist in steering the vehicle 10, and other operator action.

FIGS. 6 through 8D illustrate a second embodiment of the means for interconnecting the two trailing arms of the present cambering vehicle. In this embodiment, the basic configuration of the cambering vehicle is essentially the same as that illustrated in FIG. 1, with essentially the same frame structure, steering mechanism, etc. However, the trailing arm interconnecting means is different from the yoke of FIGS. 1 through 5. Corresponding components are designated by reference numerals of the one hundred series, e.g., front column 14 of FIGS. 1 and 2 is designated as front column 114 in FIGS. 6 and 7, yoke 40 of FIGS. 1 through 4 is designated as lateral link 140 in FIGS. 6 through 8D, etc.

Figure 7:
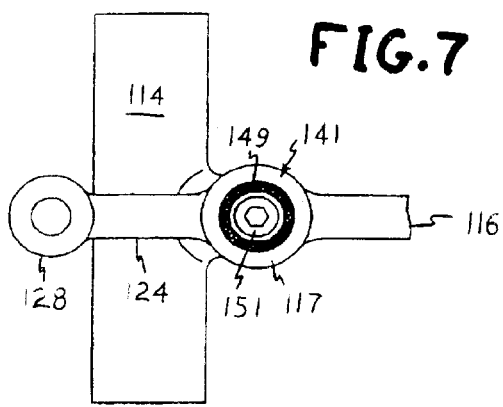
FIG. 7 is a side elevation view of the lateral link arm connecting means of FIG. 6.
Figure 6:
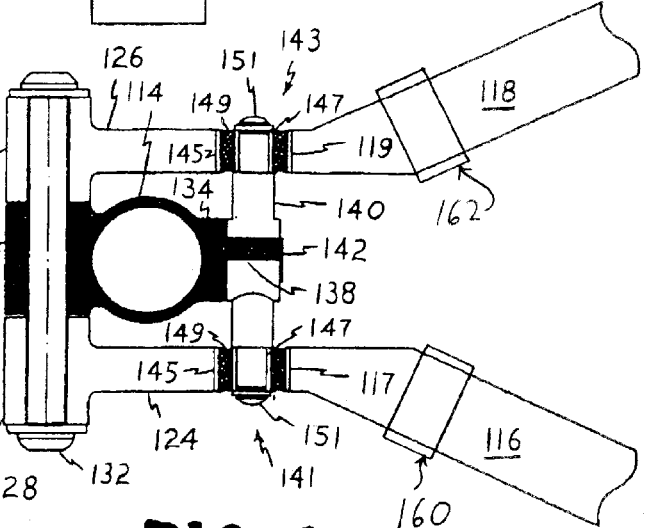
FIG. 6 is a top plan view in section of the steering column of the present cambering vehicle, showing the attachment of a lateral link thereto for connecting the two trailing arms.

FIGS. 6 and 7 respectively illustrate top plan and left side elevation views of the alternate lateral link connector 140, pivotally secured to the link attachment point 134 extending rearwardly from the front column 114. This link attachment point 134 may be essentially the same as the yoke attachment point 34 illustrated in FIG. 4, with the link 140 having a centrally disposed passage or bushing 138 formed therethrough for attaching the link 140 to the front column 114. Preferably, a Nylon or other bushing material is provided between the material of the link 140 and the attachment bolt or pin 142, to reduce friction between the components.

It will be seen that the link 140 may be permanently installed, as by permanently installing its retaining pin 142 to the link attachment boss or point 134. In any event, the permanently installed elastomeric end fittings of the link 140 preclude ease of detachment of the link 140 from the two arms 116 and 118, so there is no motivation to provide for removability of the link 140 from its attachment boss 134, as there is in the yoke 40 embodiment. However, some form of conventional folding means for the two trailing arms 116 and 118 may be provided to allow compact storage of the vehicle, if so desired. Such folding means are preferably conventional and well known in the art, e.g., telescoping tubular members with an internal tube or rod which is slid across the juncture between the two trailing arm components or hinge means 160, 162 disposed to one side of the trailing arm tubes with locking means opposite the hinges, etc.

The forward or attachment ends 124 and 126 of the two trailing arms 116 and 118 include respective bushings 128 and 130, which are in turn secured to a trailing arm attachment fitting 122 which extends across the front of the front column 114. A bolt, pin, etc. 132 passes through the two trailing arm bushings 128 and 130 and the attachment fitting 122, to secure the two trailing arms 116 and 118 pivotally to the front column 114 in the manner used for the vehicle 10 of FIG. 1. However, these two trailing arms 116 and 118 differ from their corresponding components 16 and 18 of the vehicle 10, in that the trailing arms 116 and 118 each have a link attachment boss and passage, respectively 117 and 119, formed therethrough. These link attachment points 117 and 119 provide for the attachment of the link 140 to the two trailing arms 116, 118.

The transverse link 140 is formed of a relatively thick, heavy, and strong metal (steel, etc.), to provide the desired torsional and arcuate rigidity, i.e., resistance to bending. The link 140 has a left and an opposite right end each having an elastomer bushing, respectively 141 and 143, thereon. These bushings 141 and 143 each include an outer and an inner shell or sleeve, respectively 145 and 147, with an elastomer material 149 captured therebetween; the sleeves are indicated in FIG. 6 and shown in other drawing Figures. The sleeves 145 and 147 of each bushing are affixed to the elastic material 149 therebetween, with relative motion of the two sleeves 145 and 147 of each bushing being allowed only due to the resilience of the elastomer 149; no other mechanical or other motion is provided for by the bushings.

The outer sleeves 145 of the bushings 141 and 143 are in turn immovably affixed (pressed in place, etc.) within the retaining bosses 117, 119 of the two trailing arms 116, 118, with the inner sleeves 147 of the elastomer bushings being immovably affixed to the opposite ends of the transverse link 140, e.g., by tightly securing the axial retaining bolts 151 therethrough. Thus, the only provision for relative motion between the link 140 and the two trailing arms 116, 118 is by means of the resilience of the elastomer inserts 149 of the bushings 141 and 143.

Figure 8A:
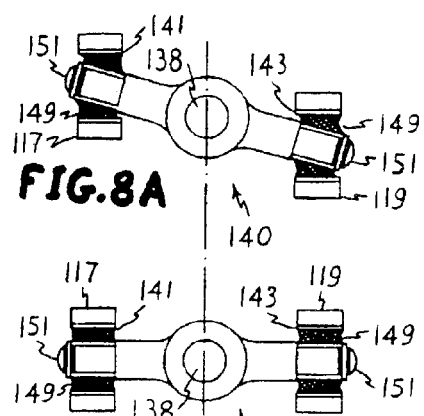
FIGS. 8A through 8D are rear elevation views of various articulations of the lateral link and trailing arm attachment, showing the resilient distortion of the elastomer bearings.

FIGS. 8A through 8D illustrate the action of the link 140 and the flexing of the elastomer insert material 149 within the bushings 141 and 143. FIG. 8A illustrates the configuration of the transverse link 140 and its attached bushings 141 and 143 and respectively attached trailing arm bosses 117 and 119, when the right trailing arm 118 is deflected downwardly and the left arm 116 is correspondingly and equally deflected upwardly. The rigidity of the link 140 results in its rocking back and forth arcuately about its attachment boss or passage 138, secured to the front column 114 by the link attachment point 134 and bolt or pin 142. However, the relative motion between the link ends and the trailing arm lugs 117 and 119 is absorbed by the elastomer material 149 of the respective two bushings 141 and 143; the deflection of the elastomer material 149 is clearly shown in FIG. 8A. While the elastomer material 149 allows some arcuate and pivotal freedom of motion between the link ends and the trailing arms 116 and 118, the link 140 and trailing arms 116, 118 remain directly, but resiliently, connected.

Figure 8B:
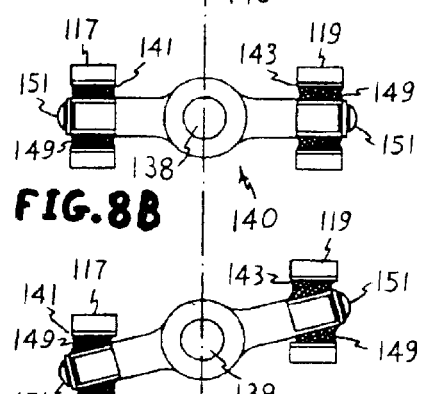

It will be seen that if all differential forces to the two trailing arms 116, 118 are released, that the resilience of the elastomer material 149 within the two elastomer bushings 141, 143 will apply a restoring force to urge the two trailing arms 116, 118 to center to a generally parallel orientation relative to one another as the resilient forces within the elastomer material 149 equalize. The rest state of this embodiment is illustrated in FIG. 8B of the drawings, where the elastomer material 149 is disposed equally within each bushing 141 and 143, with no appreciable distortion.

This provides certain benefits for the cambering vehicle equipped with the link 140 and elastomer connecting means 141, 143 of FIGS. 6 through 8D. First of all, since there are no relatively sliding components between the link ends and the trailing arms, there is no need for lubrication at these junctures. Secondly, the increasing resistance of the elastomer material 149 as the trailing arms 116, 118 are deflected to a greater angular difference between the two, results in a restorative force which assists in stabilizing the vehicle and preventing too great a deflection between the two arms 116 and 118 and resulting collapse of the vehicle. The prevention of excessive angular difference between the two arms 16 and 18 of the vehicle 10 of FIG. 1 requires a stop brace 50, with the increasing resistance of the elastomer 149 precluding any requirement for such a stop brace for the transverse link and elastomer connecting means embodiment illustrated in FIGS. 6 through 8D.

Another advantage is that the elastomer joints serve to cushion asymmetrical impact forces incurred when traversing rough surfaces. While the tires of the vehicle absorb such impacts and forces where the vehicle is equipped with tires (as opposed to skates, skis, etc.), the resilience of the elastomer material provides further shock absorption capability to cushion the forces imparted to the various mechanisms of the vehicle.

Finally, the equalizing forces developed by the elastic material 149 as it attempts to neutralize the positions of the two trailing arms 116 and 118, result in the vehicle remaining in an upright stance when all forces are removed therefrom, as when parked upright or placed at rest. The resilience of the two elastomer inserts 149 of the bushings 141 and 143, tend to prevent the two arms 116 and 118 from deflecting relative to one another, thus holding the vehicle in an upright position at rest without need for any additional support means.

Figure 8C:
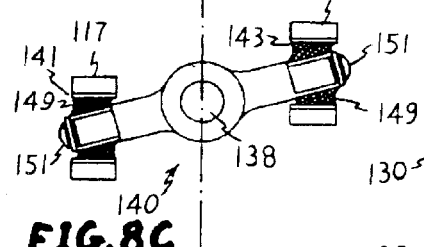

FIG. 8C illustrates the link 140, bushing 141 and 143, and trailing arm boss 117, 119 configuration when the left arm 116 is deflected downwardly with the right arm taking a resultant upward deflection, i.e., a situation opposite that shown in FIG. 8A. The deflection of the elastomer material 149 in the two elastomer bushings 141, 143 will be seen to be opposite that shown in FIG. 8A, where the trailing arms 116, 118 are deflected in the opposite direction. The result is still a restorative force which urges the two trailing arms 116, 118 back to the neutral position illustrated in FIG. 8B.

Figure 8D:
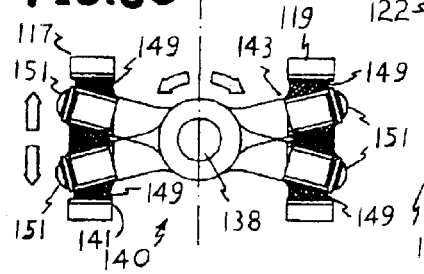

FIG. 8D illustrates the clockwise and counterclockwise pivoting of the transverse link 140 about its link bushing or attachment 138, as would occur during normal operation of the vehicle equipped with the link 140 and bushings 141, 143. The alternating upward and downward deflection of the two trailing arms 116, 118 during the sinusoidal travel of the vehicle, results in the rocking back and forth of the transverse link 140, with the two elastomer bushings 141, 143 constantly applying a restorative force attempting to neutralize the position of the two arms 116, 118 back to the neutral position of FIG. 8B.

The operator of the vehicle need only swing his or her body inwardly toward the center of the arcuate path traveled by the vehicle, in order to overcome this centering force and accelerate the vehicle due to the principle of conservation of momentum, as discussed further above. The restorative force developed by the two elastomer bushings 141, 143 is relatively easily overcome during vehicle operation, yet provides sufficient resistance to restrict trailing arm travel beyond a certain point and to hold the vehicle in an upright position when parked. The resistance of the bushings 141, 143 may be adjusted as desired by adjusting the inner and outer diameter of the elastomer material 149, the length of the bushings 141 and 143, and/or the durometer of the elastic material 149, as desired.

In summary, the present cambering vehicle and its novel yoke mechanism for controlling opposite arcuate motion of the two trailing arms, provides a more efficient and cleaner means of providing for the control of such motion as required in such vehicles. The unitary, monolithic construction of the yoke mechanism of conventional weldments, results in a simple, inexpensive, and easily constructed unit, with no other parts or components being required to affect the required action of the trailing arms. Another advantage to the present mechanism is its attachment and ease of removal by means of a single pivot bolt, which enables the vehicle to be folded to an essentially flat configuration for storage. The yoke may be reinstalled upon its attachment point to the rear of the forward column to preclude its loss during storage, after being removed from the trailing arms.

The present vehicle may be constructed in the same manner as the yoke mechanism described above, i.e., welded up of conventional metal tubular stock, as shown in the drawing Figures. Other construction means (e. g., stampings, carbon fiber and/or other composites, etc.) may be used for large scale production, if so desired. The present cambering vehicle and its yoke mechanism provide a much needed improvement in efficiency of construction for such devices, with its operation providing excellent exercise, as well as transportation, for the operator.

In another embodiment, the yoke assembly is replaced with a rigid transverse link having elastomer end bushings which are installed in cooperating fittings within the trailing arms. No relative mechanical motion is permitted between any of the rigid components of the link and trailing arms. Rather, all relative motion is taken up by the elastomer material within the bushings. This provides several advantages, i. e., (1) no lubrication is required, as there is no relative motion between wearing parts; (2) the bushings constantly seek to return the trailing arms to a neutral configuration where they are parallel to one another, thus stabilizing the vehicle to a great extent; (3) this restorative force allows the vehicle to be parked upright, without need for additional parking stands or the like; and (4) the elastomer provides additional cushioning and shock absorbing properties, for a smoother ride and for resisting shock damage to various components. Whether the yoke or elastomer bushing and transverse link embodiment is used, the present cambering vehicle embodiments provide numerous advantages and benefits over other cambering vehicles of the prior art.

It is to be understood that the present invention is not limited to the sole embodiment described above, but encompasses any and all embodiments within the scope of the following claims.

I claim:

1. A tricycle comprising:
    a front tube;
    a handlebar frame comprising an upright portion which is received in said front tube, and a grip portion extending from two sides of the top end of said upright portion;
    a front fork comprising two side wings extending from the bottom end of said upright portion such that the free ends of said side wings are provided with a shaft connection portion;
    a front wheel fastened with said shaft connection portion;
    two footboard frames fastened with two sides of said front tube and formed of a bottom tube which is pivoted at the front end with said front tube, a footboard fastened with the rear end of said bottom tube, and a rear wheel fastened beneath said footboard, said bottom tube being provided with a through hole for disposing a buffer member of an elastic material and having at the center thereof a through hole;
    a swiveling member pivoted to the rear end of said front tube and provided in two sides thereof with an insertion pillar, which is received in said through hole of said buffer member.

2. The tricycle as defined in claim 1, wherein said front tube is provided at the front end with a pivoting seat which is provided in the center thereof with a pivoting hole; wherein said bottom tubes are provided at the front end with a pivoting hole whereby said bottom tubes and said front tube are pivoted together by a pivot which is received in said pivoting holes of said pivoting seat and said bottom tubes.

3. The tricycle as defined in claim 1, wherein said buffer member is provided in an outer edge with an outer protective tube in contact with the inner edge of said through hole of said bottom tubes.

4. The tricycle as defined in claim 3, wherein said through hole of said buffer member is provided in periphery thereof with an inner protective tube in contact with the outer edge of said insertion pillar of said swiveling member.

5. The tricycle as defined in claim 1, wherein said through hole of said buffer member is provided in periphery with an inner protective tube urging said insertion pillar of said swiveling member.

6. The tricycle as defined in claim 1, wherein said buffer member has an arcuate side allowing said buffer member a greater deformation.

7. The tricycle as defined in claim 1, wherein said front tube is provided at the rear end with a protruded pillar; wherein said swiveling member is provided with a through hole for receiving said protruded pillar whereby said protruded pillar is provided with a threaded hole which is engaged with a bolt for fastening said swiveling member with said front tube.

8. A cambering vehicle, comprising:
    a frame comprising a forward column, a left trailing arm and a right trailing arm, the front column having an upper end and a lower end opposite said upper end;
    each of the left and right trailing arms having a forward end and a rearward end opposite said forward end, each of the forward ends being pivotally mounted on a forward side of the forward column;
    a pivot member having a left end and a right end, the pivot member being pivotally mounted to a rear side of the forward column; and
    left and right elastomeric connectors respectively connecting the left end of the pivot member with the left trailing arm and the right end of the pivot member with the right trailing arm.

9. The vehicle according to claim 8, additionally comprising first and second folding means disposed on said first and second trailing arms, respectively, for allowing said first and second trailing arms to be folded.

10. The vehicle according to claim 8, wherein the left and right trailing arms respectively comprise left and right tubular portions disposed rearwardly from the pivot member, the vehicle additionally comprising first and second hinges disposed respectively on the left and right tubular portions.

11. The vehicle according to claim 10, wherein the left and right tubular portions extend outwardly and rearwardly from the pivot member.

12. The vehicle according to claim 8, wherein the pivot member further comprises a single torsionally and arcuately rigid rod having a pivot passage centrally disposed therethrough for pivotally securing the pivot member to a pivot attachment point on the rear side of the forward column.

13. The vehicle according to claim 12, wherein each of the left and right ends of the pivot member includes an elastomeric bushing, the bushing comprising an elastomer material.

14. The vehicle according to claim 8, additionally comprising forward, left, and right surface contact means respectively mounted at the forward column, the rearward end of the left trailing arm, and the rearward end of the right trailing arm.

15. The vehicle according to claim 14, wherein said forward, left and right surface contact means comprise at least one of wheels, wheeled skates, ice skates, and skis.

16. A cambering vehicle, comprising:
a frame comprising a forward column, a left trailing arm and a right trailing arm, the front column having an upper end and a lower end opposite said upper end;
each of the left and right trailing arms having a forward end and a rearward end opposite said forward end, each of the forward ends being pivotally mounted relative to the forward column;
a pivot member having a left end and a right end, the pivot member being pivotally mounted relative to the forward column; and
left and right hinges disposed respectively on the left and right trailing arms rearwardly from the pivot member;
wherein the forward ends of the left and right trailing arms are pivotally mounted to a forward side of the forward column, the pivot member being pivotally mounted to a rearward side of the forward column.

17. The vehicle according to claim 16, wherein the left and right trailing arms comprise left and right tubular portions, respectively, extending rearwardly from the pivot member.

18. The vehicle according to claim 17, wherein the left and right tubular portions extend outwardly and rearwardly from the pivot member.

19. The vehicle according to claim 18, wherein the left and right hinges are disposed on the left and right tubular portions, respectively.

20. The vehicle according to claim 16, additionally comprising forward, left and right surface contact means comprising at least one of wheels, wheeled skates, ice skates, and skis.

21. The vehicle as set forth in claim 16, wherein said pivot member is permanently attached to the forward column.

22. The vehicle as set forth in claim 16 additionally comprising forward, left and right surface contact means respectively supporting the forward column, the rearward end of the left trailing arm, and the rearward end of the right trailing arm.

23. The vehicle as set forth in claim 22, wherein the forward column defines a steering axis of the vehicle about which the forward surface contact means pivots, the forward contact means being a wheel configured to rotate about a wheel axis, the wheel axis being offset from the steering axis.

24. The vehicle as set forth in claim 23, wherein the wheel axis is offset rearwardly from the steering axis.

* * * * *